(12) United States Patent
Stefanski et al.

(10) Patent No.: US 11,672,258 B2
(45) Date of Patent: Jun. 13, 2023

(54) REFINED OIL COMPOSITIONS AND METHODS FOR MAKING

(71) Applicant: DSM IP Assets B.V., Herlen (NL)

(72) Inventors: Michael Lenn Stefanski, Winchester, KY (US); Nasrin Tabayehnejad, Lexington, KY (US); Chris Connor Luigart, Lexington, KY (US)

(73) Assignee: DSM IP ASSETS B.V., Heerlen (NL)

(*) Notice: Subject to any disclaimer, the term of this patent is extended or adjusted under 35 U.S.C. 154(b) by 0 days.

(21) Appl. No.: 15/754,337

(22) PCT Filed: Aug. 25, 2016

(86) PCT No.: PCT/US2016/048781
§ 371 (c)(1),
(2) Date: Feb. 22, 2018

(87) PCT Pub. No.: WO2017/035403
PCT Pub. Date: Mar. 2, 2017

(65) Prior Publication Data
US 2018/0242609 A1    Aug. 30, 2018

Related U.S. Application Data

(60) Provisional application No. 62/209,505, filed on Aug. 25, 2015.

(51) Int. Cl.
| | | |
|---|---|---|
| *A23D 9/04* | (2006.01) | |
| *C11B 3/10* | (2006.01) | |
| *C11B 3/12* | (2006.01) | |
| *C11B 3/16* | (2006.01) | |
| *A23L 33/00* | (2016.01) | |
| *A23D 9/02* | (2006.01) | |
| *A23L 2/00* | (2006.01) | |
| *A23K 50/80* | (2016.01) | |
| *A23C 9/152* | (2006.01) | |
| *A23L 33/115* | (2016.01) | |

(52) U.S. Cl.
CPC .............. *A23D 9/04* (2013.01); *A23C 9/1528* (2013.01); *A23D 9/02* (2013.01); *A23K 50/80* (2016.05); *A23L 2/00* (2013.01); *A23L 33/115* (2016.08); *A23L 33/40* (2016.08); *C11B 3/10* (2013.01); *C11B 3/12* (2013.01); *C11B 3/16* (2013.01); *A23V 2002/00* (2013.01); *Y02A 40/818* (2018.01)

(58) Field of Classification Search
CPC ......... A23D 9/04; A23K 50/80; A23L 33/115; A23L 33/40
USPC ................................................ 426/271, 601
See application file for complete search history.

(56) References Cited

U.S. PATENT DOCUMENTS

| | | | |
|---|---|---|---|
| 2,197,339 | A | 4/1940 | Gooding et al. |
| 2,415,140 | A | 2/1947 | Liebscher |
| 4,025,540 | A | 5/1977 | Kleemann et al. |
| 5,102,987 | A | 4/1992 | Cornet et al. |
| 7,098,352 | B2 | 8/2006 | Strohmaier et al. |
| 9,051,260 | B2 | 6/2015 | Rongione et al. |
| 2003/0161918 | A1 | 8/2003 | Kendrick et al. |
| 2003/0225295 | A1 | 12/2003 | Yan et al. |
| 2008/0026103 | A1* | 1/2008 | Fichtali et al. |
| 2008/0107791 | A1* | 5/2008 | Fichtali et al. |
| 2009/0023808 | A1 | 1/2009 | Raman et al. |
| 2010/0303957 | A1* | 12/2010 | Brooks et al. |
| 2011/0098356 | A1 | 4/2011 | Leininger et al. |
| 2012/0238770 | A1 | 9/2012 | Bloomer et al. |
| 2013/0101723 | A1* | 4/2013 | Verkoeijen et al. |
| 2013/0323394 | A1 | 12/2013 | Bruse et al. |
| 2014/0029649 | A1* | 10/2014 | Boam |
| 2015/0018435 | A1* | 1/2015 | Fichtali et al. |

FOREIGN PATENT DOCUMENTS

| | | | |
|---|---|---|---|
| CN | 103369972 | A | 10/2013 |
| CN | 102822326 | B | 10/2014 |
| CN | 104507325 | A | 4/2015 |
| CN | 103608443 | B | 8/2016 |
| CN | 103908946 | B | 4/2018 |
| CZ | 303281 | | 7/2012 |
| DK | 3643848 | A1 | 9/1988 |
| DK | 102008060059 | A1 | 6/2010 |
| EP | 0 659 347 | * | 12/1994 |
| FR | 2779447 | A1 | 12/1999 |
| GB | 1491170 | * | 9/1977 |
| GB | 1491170 | A | 11/1977 |
| JP | 2000-144168 | A | 5/2000 |
| JP | 2015105354 | A2 | 6/2015 |
| WO | 2005021476 | A1 | 3/2005 |
| WO | 2006052974 | A1 | 5/2006 |
| WO | 2010126136 | A1 | 11/2010 |
| WO | WO2011002275 | * | 1/2011 |
| WO | 2011002275 | A8 | 1/2012 |
| WO | 2012031176 | A1 | 3/2012 |
| WO | 2012165397 | A1 | 12/2012 |
| WO | 2013163112 | A1 | 10/2013 |
| WO | 2015020236 | A1 | 2/2015 |
| WO | 2015057139 | A1 | 4/2015 |

OTHER PUBLICATIONS

Kuhlmann, J. "2-Monochloropropanediol, 3-MCPD and Glycidol In Infant and Adult/pediatric Nutritional Formula", pp. 1205, 1206 ., J. of AOAC International, vol. 102, No. 4, 2019. (Year: 2019).*

Baer, Ines Dr., "Chloropropanols and their esters" Joint Research Centre (JRC)—European Commission, Institute for Reference Materials and Measurements (IRMM), Geel, Belgium, Sep. 2, 2010 (35 pages).

(Continued)

*Primary Examiner* — Helen F Heggestad
(74) *Attorney, Agent, or Firm* — McBee Moore & Vanik IP, LLC

(57) ABSTRACT

A refined oil comprising at least one polyunsaturated fatty acid (PUFA), wherein the oil has a fatty acid ester of monochloropropanediol, epoxypropanol, and mixtures thereof in an amount of 10 ppm or less, and processes for producing the oil. The oil is preferably a microbial or marine oil.

55 Claims, No Drawings

(56) References Cited

OTHER PUBLICATIONS

Franke, K., et al., "Influence of chemical refining process and oil type on 2-propanediol contents in palm oil and rapeseed oil", LWT—Food Science and Technology 42, pp. 1751-1754 (2009).

Hamlet, C. G., et al., "The occurrence of fatty acid esters of chloropropanediols in foods: a review prepared for the UK Food Standards Agency", The Institute of Chemical Technology Prague, Report No. C028 (Oct. 2010).

Larsen, John Christian, "3-MCPD Esters in Food Products", ILSL Europe Report Series, International Life Sciences Institute (Oct. 2009).

Lecocq, Nathalie, "3-MCPD ester and glycidyl ester-Mitigation strategies during the production of vegetable oils and fats", FEDIOL, The EU Vegetable Oil and Proteinmeal Industry Presentation, Oct. 7, 2014.

Matthaus, Bertrand, et al., "Toolbox for the Mitigation of 3-MCPD Esters and Glycidyl Esters in Food", BLL FoodDrink Europe (2006).

Matthäus, Bertrand, et al., "Final Results from the German FEI Research Project Concerning 3-MCPD Esters and Related Compounds—Mitigation Strategies", PPM Presentation, Euro Fed Lipid Congress, Rotterdam (2011).

Mitchell, L. C., "Specific Diacid Triglycerides by a Simple Two-step Procedure", J. American Oil Chemists' Society, vol. 49:281-282 (1971).

Patin, A., et al., "Formation Pathways for 3-MCPD di-Esters and Glycidyl Esters under Thermal Conditions", Nestle® Research, Berlin (Jun. 2017).

Pudel, F., et al., "On the necessity of edible oil refining and possible sources of 3-MCPD and glycidyl esters", Eur. J. Lipid Sci Technol., 113:368-373 (2011).

Rahn, Anja, "Mechanism of formation and mass spectral characterization of thermally generated toxicants: chloropropanols and their esters", Department of Food Science and Agricultural Chemistry, McGill University, Montreal (Dec. 2013).

Schatzmann, C., et al., "Approaches for the Mitigation of 3-MCPD Esters and Glycidyl Esters in Baby Food", Nestle® Research, Berlin (Jun. 2017).

Svejkovska, Blanka, et al., "Formation and Decomposition of 3-Chloropropane-1,2-diol Esters in Models Simulating Processed Foods", Czech J. Food Sci, vol. 24, 4:172-179 (2006).

Velisek, Jan, et al., "3-Chloropropane-1,2-diol in Models Simulating Processed Foods: Precursors and Agents Causing its Decomposition", Czech J. Food Sci., vol. 21, No. 5:153-161 (2003).

Velisek, Jan, et al., "Optical Isomeers of Chloropropanediols: Mechanisms of their Formation and Decomposition in Protein Hydrolysates", Czech. J. Food Sci., vol. 20, 5:161-170 (2002).

\* cited by examiner

REFINED OIL COMPOSITIONS AND METHODS FOR MAKING

CROSS-REFERENCE TO RELATED APPLICATIONS

This application is a US National Stage of International Application No. PCT/US2016/048781 filed Aug. 25, 2016, which designated the US and claims the benefit of the filing date of United States Provisional Patent Application No. 62/209,505 filed Aug. 25, 2015, the entire contents of each of which are hereby incorporated herein by reference in their entireties.

BACKGROUND OF THE INVENTION

Many polyunsaturated fatty acids (PUFAs) are known to have therapeutic and nutritional benefits. Docosahexaenoic acid (DHA), for example, has been used to treat cardiovascular and inflammatory diseases. Arachidonic acid (ARA) cannot be synthesized de novo in humans and both ARA and DHA are critical elements of muscle, organ and vascular tissues.

Edible oils, particularly those containing PUFAs, are susceptible to oxidation which may cause undesirable organoleptic properties such as a fishy smell or taste. To remove particular compounds which may contribute to oxidation, these oils are refined, especially if they are to be used for human consumption. During the refining process, some compounds may be formed. Examples of such compounds are fatty acid esters of monochloropropanediol and epoxypropanol, such as fatty acid esters of 2-monochloropropane-1,2 diol, (2-MCPD), 3-monochloropropane-1,2 diol (3-MCPD) and 2,3-epoxy-1-propanol (glycidol). These compounds have been shown to be formed during the deodorization step of oil refining.

The exact mechanism of formation is not clearly understood, which makes mitigation of the ester formation difficult. Processes for reduction of 3-MCPD in other oils have been attempted, but there are no processes which provide for preventing and/or reducing the formation of, or reducing the levels of, fatty acid esters of monochloropropanediol and epoxypropanol, including fatty acid esters of 2-MCPD, 3-MCPD and 2,3-epoxy-1-propanol.

SUMMARY OF THE INVENTION

Disclosed herein is a refined oil comprising at least one polyunsaturated fatty acid (PUFA), wherein the oil has a fatty acid ester of monochloropropanediol, epoxypropanol, and mixtures thereof in an amount of 10 ppm or less. Preferably, the fatty acid ester is a fatty acid ester of 2-monochloropropane-1,2-diol (2-MCPD), 3-monochloropropane-1,2-diol (3-MCPD), 2,3-epoxy-1-propanol (glycidol), and mixtures thereof. More preferably, the fatty acid ester is a fatty acid ester of 2-monochloropropane-1,2-diol (2-MCPD) and/or 3-monochloropropane-1,2-diol (3-MCPD).

Disclosed herein are processes for reducing and/or preventing the formation of, or decreasing the level of, at least one fatty acid ester in an oil comprising treating the oil with at least one of a silica, a bleaching earth, an activated carbon, and combinations thereof, and deodorizing the oil, wherein the oil is subjected to steam under heat, and wherein the fatty acid ester is a fatty acid ester of monochloropropanediol, epoxypropanol, and mixtures thereof, and oils prepared by the processes disclosed herein. Preferably, the fatty acid ester is a fatty acid ester of 2-monochloropropane-1,2-diol (2-MCPD), 3-monochloropropane-1,2-diol (3-MCPD), 2,3-epoxy-1-propanol, and mixtures thereof. Preferably, the oil is a microbial or marine oil.

DETAILED DESCRIPTION OF THE INVENTION

In one embodiment, the present invention is a refined oil comprising at least one polyunsaturated fatty acid (PUFA), wherein the oil has a fatty acid ester of monochloropropanediol, epoxypropanol, and mixtures thereof in an amount of 10 ppm or less. Preferably, the fatty acid ester is a fatty acid ester of 2-monochloropropane-1,2-diol (2-MCPD) and/or 3-monochloropropane-1,2-diol (3-MCPD).

In another embodiment, the present invention is a process for reducing and/or preventing the formation of, or decreasing the level of, at least one fatty acid ester in an oil comprising treating the oil with at least one of a silica, a bleaching earth, an activated carbon, and combinations thereof, and deodorizing the oil, wherein the oil is subjected to steam under heat, and wherein the fatty acid ester is a fatty acid ester of monochloropropanediol, epoxypropanol, and mixtures thereof. Preferably, the fatty acid ester is a fatty acid ester of 2-monochloropropane-1,2-diol (2-MCPD) and/or 3-monochloropropane-1,2-diol (3-MCPD).

In another embodiment, the present invention is a refined oil prepared by the processes disclosed herein.

The features and advantages of the invention may be more readily understood by those of ordinary skill in the art upon reading the following detailed description. It is to be appreciated that certain features of the invention that are, for clarity reasons, described above and below in the context of separate embodiments, may also be combined so as to sub-combinations thereof.

Embodiments identified herein as exemplary are intended to be illustrative and not limiting.

In this specification and in the claims that follow, reference will be made to a number of terms, which shall be defined to have the following meanings:

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

Disclosed herein is a refined oil comprising at least one polyunsaturated fatty acid (PUFA), wherein the oil has a fatty acid ester of monochloropropanediol, epoxypropanol, and mixtures thereof in an amount of 10 ppm or less.

Also disclosed herein is a refined oil comprising at least one polyunsaturated fatty acid (PUFA) having a reduced level of at least one fatty acid ester of monochloropropanediol, epoxypropanol, and mixtures thereof, wherein the oil has been subjected to a process comprising treating the oil with at least one of a silica, a bleaching earth, an activated carbon, and combinations thereof, and deodorizing the oil, in which the oil is subject to steam under heat. Preferably, the process reduces and/or prevents formation of the fatty acid ester of monochloropropanediol, epoxypropanol, and mixtures thereof.

In one embodiment, the fatty acid ester of monochloropropanediol is a fatty acid ester of 2-monochloropropane-1,2-diol ("bound 2-monochloropropane-1,2-diol" or "bound 2-MCPD"), 3-monochloropropane-1,2-diol ("bound 3-monochloropropane-1,2-diol" or "bound 3-MCPD"), and mixtures thereof. In one embodiment, the fatty acid ester of epoxypropanol is a fatty acid ester of 2,3-epoxy-1-propanol ("bound 2,3-epoxy-1-propanol")

As used throughout, "bound 2-monochloropropane-1,2-diol or "bound 2-MCPD", means the residues of 2-monochloropropane-1,2-diol that are esterified to fatty acids. As used throughout, "bound 3-monochloropropane-1,2-diol or "bound 3-MCPD", means the residues of 3-monochloropropane-1,2-diol that are esterified to fatty acids. As used throughout, "bound 2,3-epoxy-1-propanol" means the residues of 2,3-epoxy-1-propanol that are esterified to fatty acids.

Disclosed herein are processes for reducing and/or preventing the formation of, or decreasing the level of, at least one fatty acid ester in an oil comprising treating the oil with at least one of a silica, a bleaching earth, an activated carbon, and combinations thereof, and deodorizing the oil, wherein the oil is subjected to steam under heat, and wherein the fatty acid ester is a fatty acid ester of monochloropropanediol, epoxypropanol, and mixtures thereof. Further disclosed are oils prepared by the processes disclosed herein. Preferably, the fatty acid ester is a fatty acid ester of 2-monochloropropane-1,2-diol (2-MCPD) and/or 3-monochloropropane-1,2-diol (3-MCPD), or a fatty acid ester of epoxypropanol.

In some embodiments, the amount of the fatty acid ester of monochloropropanediol, epoxypropanol, and mixtures thereof is about 10 ppm or less; about 9 ppm or less; about 8 ppm or less; about 7 ppm or less; about 6 ppm or less; about 5 ppm or less; about 4.5 ppm or less; about 4 ppm or less; about 3.5 ppm or less; about 3 ppm or less; about 2.5 ppm or less; about 2 ppm or less; about 2 ppm or less; about 1.5 ppm or less; about 1 ppm or less; about 0.9 ppm or less; about 0.8 ppm or less; about 0.7 ppm or less; about 0.6 ppm or less; about 0.5 ppm or less; about 0.4 ppm or less; about 0.3 ppm or less; about 0.2 ppm or less; about 0.1 ppm or less. In one embodiment, the amount of the fatty acid ester of monochloropropanediol, epoxypropanol, and mixtures thereof is about 1 ppm or less. In another embodiment, the amount of the fatty acid ester of monochloropropanediol, epoxypropanol, and mixtures thereof is about 0.5 ppm or less. In another embodiment, the amount of the fatty acid ester of monochloropropanediol, epoxypropanol, and mixtures thereof is about 0.3 ppm or less. In another embodiment, the amount of the fatty acid ester of monochloropropanediol, epoxypropanol, and mixtures thereof is about 0.1 ppm or less.

In some embodiments, the amount of bound 2-MCPD is about 10 ppm or less; about 9 ppm or less; about 8 ppm or less; about 7 ppm or less; about 6 ppm or less; about 5 ppm or less; about 4.5 ppm or less; about 4 ppm or less; about 3.5 ppm or less; about 3 ppm or less; about 2.5 ppm or less; about 2 ppm or less; about 2 ppm or less; about 1.5 ppm or less; about 1 ppm or less; about 0.9 ppm or less; about 0.8 ppm or less; about 0.7 ppm or less; about 0.6 ppm or less; about 0.5 ppm or less; about 0.4 ppm or less; about 0.3 ppm or less; about 0.2 ppm or less; about 0.1 ppm or less. In one embodiment, the amount of bound 2-MCPD is about 1 ppm or less. In another embodiment, the amount of bound 2-MCPD is about 0.5 ppm or less. In another embodiment, the amount of bound 2-MCPD is about 0.3 ppm or less. In another embodiment, the amount of bound 2-MCPD is about 0.1 ppm or less.

In some embodiments, the amount of bound 3-MCPD is about 10 ppm or less; about 9 ppm or less; about 8 ppm or less; about 7 ppm or less; about 6 ppm or less; about 5 ppm or less; about 4.5 ppm or less; about 4 ppm or less; about 3.5 ppm or less; about 3 ppm or less; about 2.5 ppm or less; about 2 ppm or less; about 2 ppm or less; about 1.5 ppm or less; about 1 ppm or less; about 0.9 ppm or less; about 0.8 ppm or less; about 0.7 ppm or less; about 0.6 ppm or less; about 0.5 ppm or less; about 0.4 ppm or less; about 0.3 ppm or less; about 0.2 ppm or less; about 0.1 ppm or less. In one embodiment, the amount of bound 3-MCPD is about 1 ppm or less. In another embodiment, the amount of bound 3-MCPD is about 0.5 ppm or less. In another embodiment, the amount of bound 3-MCPD is about 0.3 ppm or less. In another embodiment, the amount of bound 3-MCPD is about 0.1 ppm or less.

In some embodiments, the amount of bound 2,3-epoxy-1-propanol is about 10 ppm or less; about 9 ppm or less; about 8 ppm or less; about 7 ppm or less; about 6 ppm or less; about 5 ppm or less; about 4.5 ppm or less; about 4 ppm or less; about 3.5 ppm or less; about 3 ppm or less; about 2.5 ppm or less; about 2 ppm or less; about 2 ppm or less; about 1.5 ppm or less; about 1 ppm or less; about 0.9 ppm or less; about 0.8 ppm or less; about 0.7 ppm or less; about 0.6 ppm or less; about 0.5 ppm or less; about 0.4 ppm or less; about 0.3 ppm or less; about 0.2 ppm or less; about 0.1 ppm or less. In one embodiment, the amount of bound 2,3-epoxy-1-propanol is about 1 ppm or less. In another embodiment, the amount of bound 2,3-epoxy-1-propanol is about 0.5 ppm or less. In another embodiment, the amount of bound 2,3-epoxy-1-propanol is about 0.3 ppm or less. In another embodiment, the amount of bound 2,3-epoxy-1-propanol is about 0.1 ppm or less.

Anisidine value refers to the measure of secondary reaction products, such as aldehydes and ketones that occur during oxidation of the oil. In some embodiments, the oil described herein has an AV of less than about 50; less than about 40; less than about 30; less than about 20; less than about 15; or less than about 10. In one embodiment, the oil has an AV of less than about 20. In another embodiment, the oil has an AV of less than about 10. In another embodiment, the oil has an AV of less than about 5.

Peroxide value refers to the measure of primary reaction products, such as peroxides and hydroperoxides that occur during oxidation of the oil. In some embodiments, the oil described herein has a PV less than about 20 meq/kg; less than about 10 meq/kg; less than about 5 meq/kg; less than about 3 meq/kg; less than about 1 meq/kg; less than about 0.5 meq/kg; less than about 0.1 meq/kg. In one embodiment, the oil has a PV of less than about 5 meq/kg. In another embodiment, the oil has a PV of less than about 1 meq/kg. In another embodiment, the oil has a PV of less than about 0.5 meq/kg.

Polyunsaturated fatty acids (PUFAs) are classified based on the position of the first double bond from the methyl end of the fatty acid; omega-3 (n-3) fatty acids contain a first double bond at the third carbon, while omega-6 (n-6) fatty acids contain a first double bond at the sixth carbon. For example, docosahexaenoic acid (DHA) is an omega-3 long chain polyunsaturated fatty acid (LC-PUFA) with a chain length of 22 carbons and 6 double bonds, often designated as "22:6n-3." In one embodiment, the PUFA is selected from an omega-3 fatty acid, an omega-6 fatty acid, and mixtures thereof. In another embodiment, the PUFA is selected from docosahexaenoic acid (DHA), eicosapentaenoic acid (EPA), docosapentaenoic acid (DPA), arachidonic acid (ARA), gamma-linolenic acid (GLA), dihomo-gamma-linolenic acid (DGLA), stearidonic acid (SDA), and mixtures thereof. In another embodiment, the PUFA is selected from ARA, EPA, DHA, and mixtures thereof. In another embodiment, the PUFA is DHA. In a further embodiment, the PUFA is ARA. In yet a further embodiment, the PUFA is EPA.

The PUFAs can be in the form of a free fatty acid, salt, fatty acid ester (e.g. methyl or ethyl ester), monoacylglycerol (MAG), diacylglycerol (DAG), triacylglycerol (TAG), and/or phospholipid (PL).

In some embodiments, the oil comprises one or more PUFAs. In some embodiments, the oil comprises at least about 10%, at least about 15%, at least about 20%, at least about 25%, at least about 30%, at least about 35%, at least about 40%, at least about 45%, at least about 50%, at least about 60%, at least about 70% or at least about 80% PUFA. In some embodiments, the oil comprises at least about 10%, at least about 15%, at least about 20%, at least about 25%, at least about 30%, at least about 35%, at least about 40%, at least about 45%, at least about 50%, at least about 60%, at least about 70% or at least about 80% DHA (by DHA weight), and/or at least about 10%, at least about 15%, or at least about 20% DPA n-6 (by DPA n-6 weight), and/or at least about 10%, at least about 15%, at least about 20%, at least about 25%, at least about 30%, at least about 35%, at least about 40%, at least about 45%, at least about 50%, at least about 60%, at least about 70% or at least about 80% EPA (by EPA weight), and/or at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, or at least about 80% ARA (by ARA weight).

In some embodiments, the oil is a microbial or marine oil.

Oil produced by a microorganism or obtained from a microbial cell is referred to as "microbial oil". Oil produced by algae and/or fungi is also referred to as an algal and/or a fungal oil, respectively.

As used herein, a "microorganism" refers to organisms such as algae, bacteria, fungi, protist, yeast, and combinations thereof, e.g., unicellular organisms. A microorganism includes but is not limited to, golden algae (e.g., microorganisms of the kingdom Stramenopiles); green algae; diatoms; dinoflagellates (e.g., microorganisms of the order Dinophyceae including members of the genus *Crypthecodinium* such as, for example, *Crypthecodinium cohnii* or *C. cohnii*); microalgae of the order Thraustochytriales; yeast (Ascomycetes or Basidiomycetes); and fungi of the genera *Mucor, Mortierella*, including but not limited to *Mortierella alpina* and *Mortierella* sect. *schmuckeri*, and *Pythium*, including but not limited to *Pythium insidiosum*.

In one embodiment, ARA is obtained from microorganism from the genus *Mortierella*, which includes, but is not limited to, *Mortierella elongata, Mortierella exigua, Mortierella hygrophila, Mortierella alpina, Mortierella schmuckeri*, and *Mortierella minutissima*. In a further embodiment, ARA is obtained from microorganisms from *Mortierella elongata* IFO8570, *Mortierella exigua* IFO8571, *Mortierella hygrophila* IFO5941, *Mortierella alpina* IFO8568, ATCC16266, ATCC32221, ATCC42430, CBS219.35, CBS224.37, CBS250.53, CBS343.66, CBS527.72, CBS529.72, CBS608.70, and CBS754.68, and mutants thereof. In a still further embodiment, the microorganisms are *Mortierella alpina*. Table 1 is a representative fatty acid profile of an oil produced from *Mortierella alpina*.

In another embodiment, DHA is obtained from microorganisms of the order Dinophyceae, which includes, but is not limited to, members of the genus *Crypthecodinium* such as, for example, *Crypthecodinium cohnii* or *C. cohnii*. Table 2 is a representative fatty acid profile of an oil produced from *Crypthecodinium cohnii*.

In a further embodiment, DHA is obtained from the microorganisms from the order Thraustochytriales, which includes, but is not limited to, the genera *Thraustochytrium* (species include *arudimentale, aureum, benthicola, globosum, kinnei, motivum, multirudimentale, pachydermum, proliferum, roseum, striatum*); the genera *Schizochytrium* (species include *aggregatum, limnaceum, mangrovei, minuturn, octosporum*); the genera *Ulkenia* (species include *amoeboidea, kerguelensis, minuta, profunda, radiate, sailens, sarkariana, schizochytrops, visurgensis, yorkensis*); the genera *Aurantiacochytrium*; the genera *Oblongichytrium*; the genera *Sicyoidochytium*; the genera *Parientichytrium*; the genera *Botryochytrium*; and combinations thereof. Species described within *Ulkenia* will be considered to be members of the genus *Schizochytrium*. In another embodiment, the microorganisms are from the order Thraustochytriales. In yet another embodiment, the microorganisms are from *Thraustochytrium*. In still a further embodiment, the microorganisms are from *Schizochytrium* sp. In some embodiments, the invention is directed to a thraustochytrid of the species deposited under ATCC Accession No. PTA-9695, ATCC Accession No. 10288, ATCC Accession No. PTA-10212, PTA-10213, PTA-10214, PTA-10215, PTA-10208, PTA-10209, PTA-10210, or PTA-10211. Tables 3-5 are representative fatty acid profiles of oils produced from *Schizochytrium* sp.

TABLE 1

Fatty Acid Profile, Oil from *Mortierella alpina*

| Fatty Acid | % FAME |
|---|---|
| 20:4 | 46.6% |
| 20:5 | 0 |
| 22:5 n-3 | 0 |
| 22:5 n-6 | 0 |
| 22:6 | 0 |

TABLE 2

Fatty Acid Profile, Oil from *Crypthecodinium Cohnii*

| Fatty Acid | % FAME |
|---|---|
| 20:4 | <0.1% |
| 20:5 | <0.1% |
| 22:5 n-3 | 0.7% |
| 22:5 n-6 | <0/1% |
| 22:6 | 42.3% |

TABLE 3

Fatty Acid Profile, Oil from *Schizochytrium* sp.

| Fatty Acid | % FAME |
|---|---|
| 20:4 | 1.0% |
| 20:5 | 1.5% |
| 22:5 n-3 | 0.6% |
| 22:5 n-6 | 16.9% |
| 22:6 | 38.8% |

TABLE 4

Fatty Acid Profile, Oil from *Schizochytrium* sp.

| Fatty Acid | % FAME |
|---|---|
| 20:4 | 0.2% |
| 20:5 | 3.0% |
| 22:5 n-3 | 0.3% |
| 22:5 n-6 | 2.1% |
| 22:6 | 43.6% |

TABLE 5

Fatty Acid Profile, Oil from *Schizochytrium* sp.

| Fatty Acid | % FAME |
|---|---|
| 20:4 | 1.4% |
| 20:5 | 18.9% |
| 22:5 n-3 | 4.8% |
| 22:5 n-6 | 1.6% |
| 22:6 | 43.0% |

In certain embodiments, the oil can comprise a marine oil. Examples of suitable fish oils include, but are not limited to, Atlantic fish oil, Pacific fish oil, or Mediterranean fish oil, or any mixture or combination thereof. In more specific examples, a suitable fish oil can be, but is not limited to, bonito oil, pilchard oil, Pollack oil, tilapia oil, tuna oil, sea bass oil, halibut oil, spearfish oil, barracuda oil, cod oil, menhaden oil, sardine oil, anchovy oil, capelin oil, herring oil, mackerel oil, salmonid oil, tuna oil, and shark oil, including any mixture or combination thereof. Other marine oils suitable for use herein include, but are not limited to, squid oil, cuttle fish oil, octopus oil, krill oil, seal oil, whale oil, and the like, including any mixture or combination thereof.

In some embodiments, the oil is produced by a genetically modified organism.

Microbial and fish oils are subjected to further processing steps after the oils are obtained from, in the case of microbial oils, the cells produced by fermentation, or, in the case of fish oils, the fish itself. For microbial oils, one or more processing steps including refining, bleaching, winterization and deodorization may occur.

In some embodiments, the bleaching step comprises adding a silica, a bleaching earth, an activated carbon, and mixtures thereof.

Deodorizing the oil can be performed using any equipment known for use in standard deodorization processes. In some embodiments, the deodorization is performed using a short path distillation apparatus, a wiped-film evaporator, a thin-film evaporator, or a rotating packed bed deodorizer. In one embodiment, the deodorization is performed using a thin-film evaporator. In another embodiment, the deodorization is performed using a wiped-film evaporator.

In some embodiments, the deodorization uses steam. The rate of steam is at least about 1 wt. %; at least about 2 wt. %; at least about 3 wt. %; at least about 4 wt. %; at least about 5 wt. %; at least about 6 wt. %; at least about 7 wt. %; at least about 8 wt. %; at least about 9 wt. %, or at least about 10 wt. %. In one embodiment, the rate of steam is from about 1-10 wt. %; from about 2-8 wt. %; or from about 2-6 wt. %. In some embodiments, the process comprises heating the steam during deodorization to at least about 140° C., at least about 150° C., at least about 160° C., at least about 170° C., at least about 180° C., at least about 190° C., at least about 200° C., or at least about 210° C. In other embodiments, the process comprises heating the steam to from about 140° C. to about 210° C., about 150° C. to about 200° C., about 160° C. to about 190° C., about 170° C. to about 190° C., or about 175° C. to about 185° C. In one embodiment, the process comprises heating the lysed cell composition from about 170° C. to about 190° C. In one embodiment, the process comprises heating the lysed cell composition to at least about 170° C., at least about 180° C., or at least about 190° C.

Residence time is the average time the oil is in the deodorizer and is measured by volume of deodorizer divided by the flow rate. In some embodiments, the residence time of the oil in the deodorizing equipment is less than about 240 minutes, less than about 200 minutes, less than about 180 minutes, less than about 120 minutes, less than about 110 minutes, less than about 100 minutes, less than about 90 minutes, less than about 80 minutes, less than about 70 minutes, less than about 60 minutes, less than about 50 minutes, less than about 40 minutes, less than about 30 minutes, less than about 20 minutes, less than about 10 minutes, less than about 9 minutes, less than about 8 minutes, less than about 7 minutes, less than about 6 minutes, less than about 5 minutes, less than about 4 minutes, less than about 3 minutes, or less than about 2 minutes. In one embodiment the residence time is less than about 2 minutes.

In some embodiments, an oil obtained according to any of the processes described herein can be used directly as a food or food ingredient, such as an ingredient in baby food, infant formula, beverages, sauces, dairy based foods (such as milk, yogurt, cheese and ice-cream), oils (e.g., cooking oils or salad dressings), and baked goods; dietary supplements (e.g., in capsule or tablet forms); feed or feed supplement for any non-human animal (e.g., those whose products (e.g., meat, milk, or eggs) are consumed by humans); food supplements; and pharmaceuticals (in direct or adjunct therapy application). The term "animal" refers to any organism belonging to the kingdom Animalia and includes any human animal, and non-human animal from which products (e.g., milk, eggs, poultry meat, beef, pork or lamb) are derived. In some embodiments, the oil can be used in seafood. Seafood is derived from, without limitation, fish, shrimp and shellfish. The term "products" includes any product derived from such animals, including, without limitation, meat, eggs, milk or other products. When the oil is fed to such animals, polyunsaturated oils can be incorporated into the flesh, milk, eggs or other products of such animals to increase their content of these oils.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations which are apparent to one skilled in the art.

Materials and Methods

The Anisidine value (AV) is determined in accordance with AOCS Official Method Cd 18-90.

The peroxide value (PV) is determined in accordance with the AOCS Official Method Cd 8-53.

Bound 2-MCPD, bound 3-MCPD and bound 2,3-epoxy-1-propanol are determined using AOCS Official Method Cd 29a-13.

Comparative Example 1

Crude oil produced through fermentation of *C. Cohnii* is subjected to a refining, bleaching, winterization and deodorization process (RBWD). 0.25% Trisyl® 600 and 1% Tonsil® Supreme FF 126 was used in the bleaching step. The deodorization temperature was 205° C.-210° C. with a rate of steam of 2.2 wt. %. The amount of bound 3-MCPD found in the oil after processing was 24.5 ppm.

Example 1

Crude oil produced through fermentation of *C. Cohnii* is subjected to a refining, bleaching, winterization and deodorization process (RBWD) as in Comparative Example 1, except that 0.25% neutral Trisyl®, 1% neutral Tonsil® and 3% activated carbon (Norit CAl) was used in the bleaching step and the deodorization temperature was 180° C. with a rate of steam of 4.4 wt. %. The amount of bound 3-MCPD found in the oil after processing was 5.9 ppm.

Example 2

Crude oil produced through fermentation of *C. Cohnii* is subjected to a refining, bleaching, winterization and deodorization process (RBWD) as in Comparative Example 1, except that 0.25% neutral Trisyl® and 3% carbon was used in the bleaching step and the deodorization temperature was 180° C. with a rate of steam of 4.4 wt. %. The amount of bound 3-MCPD found in the oil after processing was 5.2 ppm.

Example 3

Crude oil produced through fermentation of *C. Cohnii* is subjected to a refining, bleaching, winterization and deodorization process (RBWD) as in Comparative Example 1, except that 0.25% neutral Trisyl® and 3% carbon was used in the bleaching step and the deodorization temperature was 190° C. with a rate of steam of 4.4 wt. %. The amount of bound 3-MCPD found in the oil after processing was 7.5 ppm.

Comparative Example 2

Crude oil produced through fermentation of *C. Cohnii* is subjected to a refining, bleaching, winterization and deodorization process (RBWD). 0.25% Trisyl® 600 and 1% Tonsil® Supreme FF 126 was used in the bleaching step. The deodorization temperature was 205° C.-210° C. with a rate of steam of 2.2 wt. %. 5 lots of oil were tested and the averages of the peroxide value, anisidine value, bound 3-MCPD and bound 2,3-epoxy-1-propanol are found in Table 6.

TABLE 6

|  | Average |
|---|---|
| Peroxide Value | 0.3 |
| Anisidine Value | 19.2 |
| Bound 3-MCPD (ppm) | 37.4 |
| Bound 2,3-epoxy-1-propanol (ppm) | 0.3 |

Example 4

Crude oil produced through the same fermentation process as in Comparative Example 2 is subjected to a refining, bleaching, winterization and deodorization process as in Comparative Example 2 except for the following changes: 1) during the bleaching step, a silica was used and an activated carbon was added instead of the bleaching agents used in Comparative Example 2; and 2) during the deodorization process, the oil was subjected to a temperature of 180° C. rather than a temperature of 205° C.-210° C. as used in the deodorization process of Comparative Example 2 and the rate of steam was 4.4 wt. % (as compared to 2.2 wt. % in Comparative Example 2). 4 lots of oil were tested and the peroxide value, anisidine value, and the amounts for bound 3-MCPD and bound 2,3-epoxy-1-propanol are found in Table 7.

TABLE 7

|  | Lot 1 | Lot 2 | Lot 3 | Lot 4 |
|---|---|---|---|---|
| Peroxide Value | Not Detected | Not Detected | Not Detected | Not Detected |
| Anisidine Value | 7 | 8 | 8 | 9 |
| Bound 3-MCPD (ppm) | 5.3 | 4.3 | 4.8 | 7.5 |
| Bound 2,3-epoxy-1-propanol (ppm) | 0.2 | 0.2 | 0.2 | 0.2 |

The peroxide value, anisidine value, bound 3-MCPD and bound 2,3-epoxy-1-propanol were all reduced as compared to the process used in Comparative Example 2.

Example 5

Crude oil produced through the same fermentation process as in Comparative Example 2 is subjected to a refining, bleaching, winterization and deodorization process as in Comparative Example 2 except for the following changes: 1) during the bleaching step, a silica (Trisyl® Silica) was used and an activated carbon (Nuchar SA20) was added instead of the bleaching agents used in Comparative Example 2; and 2) during the deodorization process, the oil was subjected to a temperature of 180° C. rather than a temperature of 205° C.-210° C. as used in the deodorization process of Comparative Example 2 and the rate of steam was 4.4 wt. % (as compared to 2.2 wt. % in Comparative Example 2). 3 lots of oil were tested and the peroxide value, anisidine value, and the amounts for bound 3-MCPD and bound 2,3-epoxy-1-propanol are found in Table 8.

TABLE 8

|  | Lot 1 | Lot 2 | Lot 3 |
|---|---|---|---|
| Peroxide Value | Not Detected | Not Detected | Not Detected |
| Anisidine Value | 5 | 6 | 7 |
| Bound 3-MCPD (ppm) | 2.3 | 2.6 | 2.9 |
| Bound 2,3-epoxy-1-propanol (ppm) | <0.1 | 0.1 | 0.1 |

The peroxide value, anisidine value, bound 3-MCPD and bound 2,3-epoxy-1-propanol were all reduced as compared to the process used in Comparative Example 2.

Example 6

Crude oil produced through the same fermentation process as in Comparative Example 2 is subjected to a refining, bleaching, winterization and deodorization process as in Comparative Example 2 except for a silica (Trisyl® Silica) was used and an activated carbon (Nuchar SA20) was added instead of the bleaching agents used in Comparative Example 2. During the deodorization process, the oil was subjected to a temperature of 180° C. during the deodorization process rather than a temperature of 205°-210° C. as used in the deodorization process of Comparative Example 2 and the rate of steam was 4.4 wt. % (as compared to 2.2 wt. % in Comparative Example 2). 2 lots of oil were tested and the amounts of bound 2-MCPD, bound 3-MCPD and bound 2,3-epoxy-1-propanol are found in Table 9.

TABLE 9

|  | Lot 1 | Lot 2 |
| --- | --- | --- |
| Bound 2-MCPD (ppm) | 0.4 | 0.3 |
| Bound 3-MCPD (ppm) | 3.0 | 2.5 |
| Bound 2,3-epoxy-1-propanol (ppm) | 0.1 | 0.1 |

Example 7

Different marine and microbial oils were subjected to a process of the present invention. The oils were subjected to an RBWD process wherein a silica and an activated carbon were added to each sample during the bleaching process and the samples were deodorized at 170-190° C. at a steam rate of 4.4 wt. % with a residence time of less than 2 minutes. The marine oils included tuna and anchovy and the microbial oils included an oil produced through fermentation of Schizochytrium sp. (Algal Sample 1) and an oil produced through fermentation of Crypthecodinium cohnii (Algal Sample 2). The amounts for bound 3-MCPD and bound 2,3-epoxy-1-propanol, and the anisidine values and peroxides value are found in Table 10.

TABLE 10

|  | Tuna | Anchovy | Algal sample 1[1] | Algal sample 2[2] |
| --- | --- | --- | --- | --- |
| Bound 3MCPD (ppm) | 0.4 | 0.6 | <LOQ* | <LOQ |
| Bound 2,3-epoxy-1-propanol (ppm) | 0.3 | Not measured | Not measured | <LOQ |
| Anisidine value | 6 | 4 | 11 | 10 |
| Peroxide value | 0.9 | 0.2 | 1.2 | 1.5 |

*LOQ = Limit of Quantitation = 0.3 ppm
[1]Table 3 is representative fatty acid profile for sample
[2]Table 2 is representative fatty acid profile for sample Example 8

Different microbial oils were subjected to a process of the present invention. The oils were subjected to an RBWD process wherein a silica and an activated carbon were added to each sample during the bleaching process and the samples were deodorized at 170-190° C. at a steam rate of 4.4 wt. % with a residence time of less than 2 minutes. Different microbial oils were subjected to an RBWD process as well as a fish oil and a vegetable oil (high oleic sunflower oil). The microbial oils included oils produced through fermentation of Schizochytrium sp. (Algal Samples 1-2), an oil produced through fermentation of Crypthecodinium cohnii (Algal Sample 3), and an oil produced through fermentation of Mortierella alpina (Algal Sample 4). The amounts for bound 3-MCPD, bound 2-MCPD and bound 2,3-epoxy-1-propanol are found in Table 11.

TABLE 11

|  | Bound 2MCPD (ppm) | Bound 3MCPD (ppm) | Bound 2,3-epoxy-1-propanol (ppm) |
| --- | --- | --- | --- |
| Algal Sample 1[3] | 0.1 | 0.28 | <0.1 |
| Algal Sample 2[4] | 0.13 | 0.54 | <0.1 |
| Algal Sample 3[5] | 0.29 | 2.46 | 0.12 |
| Algal Sample 4[6] | <0.1 | 0.19 | 0.19 |
| Fish Sample | 0.32 | 1.30 | 0.11 |
| Vegetable Oil | <0.1 | 0.12 | 0.56 |

[3]Table 4 is representative fatty acid profile of sample
[4]Table 3 is representative fatty acid profile of sample
[5]Table 2 is representative fatty acid profile of sample
[6]Table 1 is representative fatty acid profile of sample All references, including publications, patent applications, and patents, cited herein are hereby incorporated by reference to the same extent as if each reference were individually and specifically indicated to be incorporated by reference and were set forth in its entirety herein.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A refined microbial or marine oil comprising at least 35% of at least one polyunsaturated fatty acid (PUFA), wherein the PUFA is selected from arachidonic acid (ARA), eicosapentaenoic acid (EPA), docosahexaenoic acid (DHA), and mixtures thereof, wherein the oil has a fatty acid ester of monochloropropanediol, epoxypropanol, and mixtures thereof in an amount of 10 ppm or less, and an AnV of less than 20.

2. The oil of claim 1, wherein the fatty acid ester of monochloropropanediol is bound 2-monochloropropane-1,2-diol (2-MCPD) and/or bound 3-monochloropropane-1,2-diol (3-MCPD).

3. The oil according to claim 1 or claim 2, wherein the fatty acid ester of epoxypropanol is bound 2,3-epoxy-1-propanol.

4. The oil according to claim 1, wherein the fatty acid ester is in an amount of 1 ppm or less.

5. The oil according to claim 1, wherein the fatty acid ester is in an amount of 0.3 ppm or less.

6. The oil according to claim 1, wherein the fatty acid ester is in an amount of 0.1 ppm or less.

7. The oil according to claim 1, wherein the oil has an anisidine value of less than 10.

8. The oil according to claim 1, wherein the oil comprises at least 40% of a desired PUFA.

9. The oil according to claim 1, wherein the oil is a microbial oil.

10. The microbial oil according to claim 9, wherein the microorganism is selected from the group comprising microalgae, bacteria, fungi and protists.

11. The oil according to claim 10, wherein the microorganism is of the genus Thraustochytrium.

12. The oil according to claim 11, wherein the microorganism is of the species *Schizochytrium* sp.

13. The oil according to claim 10, wherein the microorganism is of the genus *Mortierella*.

14. The oil according to claim 10, wherein the microorganism is of the genus *Crypthecodinium*.

15. The oil according to claim 14, wherein the microorganism is of the species *Crypthecodinium cohnii*.

16. The oil according to claim 14, wherein the microorganism is of the species *Mortierella alpina*.

17. The oil according to claim 1, wherein the oil is produced by a genetically modified organism.

18. The oil according to claim 1, wherein a second oil is added to the oil.

19. The oil according to claim 18, wherein the second oil is a vegetable oil.

20. The oil according to claim 18 or claim 19, wherein the second oil has a fatty acid ester of monochloropropanediol, epoxypropanol, and mixtures thereof in an amount of 3 ppm or less.

21. The oil according to claim 18, wherein the second oil has a fatty acid ester of monochloropropanediol, epoxypropanol, and mixtures thereof in an amount of 1 ppm or less.

22. The oil according to claim 1, wherein the oil has been subjected to a process comprising treating the oil with a silica and an activated carbon, and optionally, a bleaching earth, and deodorizing the oil, in which the oil is subject to steam under heat, and wherein the temperature of the deodorization is 170-210° C.

23. The oil according to claim 22, wherein the rate of steam in the deodorization step is 1-10 wt. %.

24. The oil according to claim 22, wherein the deodorization is performed using a short path distillation apparatus, a wiped-film evaporator, a thin-film evaporator, or a rotating packed bed deodorizer.

25. The oil according to claim 22, wherein the residence time of the oil during the deodorization is less than two minutes.

26. A food product, cosmetic or pharmaceutical composition for a non-human or human, comprising the oil of claim 1.

27. The food product of claim 26, wherein the food product is an infant formula.

28. The food product of claim 26, wherein the food product is a milk, a beverage, a therapeutic drink, a nutritional drink, or a combination thereof.

29. The food product of claim 26, wherein the food product is a dietary supplement.

30. A process for reducing and/or preventing the formation, or decreasing the level of, at least one fatty acid ester in a microbial or marine oil comprising:
(a) treating the oil with a silica and an activated carbon, and, optionally, a bleaching earth; and
(b) deodorizing the oil, in which the oil is subjected to steam under heat, wherein the temperature of the deodorization is 170-190° C.; and
wherein the fatty acid ester is a fatty acid ester of monochloropropanediol, epoxypropanol, and mixtures thereof, and wherein the microbial or marine oil comprises (i) at least 35% of at least one polyunsaturated fatty acid (PUFA), wherein the PUFA is selected from arachidonic acid (ARA), eicosapentaenoic acid (EPA), docosahexaenoic acid (DHA), and mixtures thereof; and
(ii) an AnV of less than 20,
wherein the fatty acid ester is in an amount of 10 ppm or less.

31. The process of claim 30, wherein the rate of steam is 1-10 wt. %.

32. The process according to claim 30, wherein the deodorization is performed using a short path distillation apparatus, a wiped-film evaporator, a thin-film evaporator, or a rotating packed bed deodorizer.

33. The process according to claim 30, wherein the residence time of the oil during the deodorization process is less than two minutes.

34. The process according to claim 30, wherein the fatty acid ester of monochloropropanediol is bound 2-monochloropropane-1,2-diol (2-MCPD) and/or bound 3-monochloropropane-1,2-diol (3-MCPD).

35. The process according to claim 30, wherein the fatty acid ester of epoxypropanol is bound 2,3-epoxy-1-propanol.

36. The process according to claim 30, wherein the fatty acid ester is in an amount less than 5 ppm.

37. The process according to claim 30, wherein the fatty acid ester is in an amount less than 1 ppm.

38. The process according to claim 30, wherein the fatty acid ester is in an amount less than 0.3 ppm.

39. The process according to claim 30, wherein the fatty acid ester is in an amount less than 0.3 ppm.

40. The process according to claim 30, wherein the oil has an anisidine value of less than 10.

41. The process according to claim 30, wherein the oil comprises at least 40% of a desired PUFA.

42. The process according to claim 30, wherein the oil is a microbial oil.

43. The process according to claim 42, wherein the oil has been produced by a microorganism, wherein the microorganism is selected from the group comprising microalgae, bacteria, fungi and protists.

44. The process according to claim 43, wherein the microorganism is of the genus *Crypthecodinium*.

45. The process according to claim 44, wherein the microorganism is of the species *Crypthecodinium cohnii*.

46. The process according to claim 43, wherein the microorganism is of the genus *Thraustochytrium*.

47. The process according to claim 46, wherein the microalgae is of the species *Schizochytrium* sp.

48. The process according to claim 43, wherein the microorganism is of the genus *Mortierella*.

49. The process according to claim 48, wherein the microorganism is of the species *Mortierella alpina*.

50. The process according to claim 30, wherein the oil is produced by a genetically modified organism.

51. A refined oil produced by the process in claim 36.

52. A food product, cosmetic or pharmaceutical composition for a non-human or human, comprising the oil of claim 51.

53. The food product of claim 52, wherein the food product is an infant formula.

54. The food product of claim 52, wherein the food product is a milk, a beverage, a therapeutic drink, a nutritional drink, or a combination thereof.

55. The food product of claim 52, wherein the food product is a dietary supplement.

\* \* \* \* \*